(12) United States Patent
Alami et al.

(10) Patent No.: US 7,966,366 B2
(45) Date of Patent: Jun. 21, 2011

(54) DYNAMIC POSTBACK FOR LOCATION CODE EXECUTION

(75) Inventors: Rafiq El Alami, Kirkland, WA (US);
Brian O'Connor, Kenmore, WA (US);
Donald Reamey, Snoqualmie, WA (US);
Bryan Short, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 169 days.

(21) Appl. No.: 12/118,761

(22) Filed: May 12, 2008

(65) Prior Publication Data
US 2009/0282095 A1    Nov. 12, 2009

(51) Int. Cl.
*G06F 15/16* (2006.01)
(52) U.S. Cl. .......................... 709/203; 709/217; 709/224
(58) Field of Classification Search .................. 709/203, 709/217, 224
See application file for complete search history.

(56) References Cited

U.S. PATENT DOCUMENTS

| | | | |
|---|---|---|---|
| 6,782,379 B2 * | 8/2004 | Lee | 707/2 |
| 7,222,161 B2 * | 5/2007 | Yen et al. | 709/217 |
| 7,315,978 B2 | 1/2008 | Giles | |
| 2003/0061567 A1 | 3/2003 | Brown et al. | |
| 2006/0107224 A1 | 5/2006 | Friend et al. | |
| 2006/0168527 A1 | 7/2006 | Kelkar et al. | |
| 2006/0224948 A1 | 10/2006 | Desmond et al. | |
| 2007/0143305 A1 | 6/2007 | van Wyk et al. | |
| 2007/0168849 A1 | 7/2007 | Bell et al. | |
| 2007/0245227 A1 | 10/2007 | Hyland et al. | |
| 2007/0282869 A1 | 12/2007 | Paulus et al. | |

OTHER PUBLICATIONS

"What's New for InfoPath Developers", 2008, Microsoft Corporation.
Nadkarni, et al., "WebEAV: Automatic Metadata-driven Generation of Web Interfaces to Entity-Attribute-Value Databases", vol. 7, No. 4, Jul.-Aug. 2000, American Medical Informatics Association, 2000.
Schnitzenbaumer, et al., "XHTML Extended Forms Requirements", World Wide Web Consortium Working Draft Sep. 6, 1999, W3C, 1999.
Nierstrasz, et al., "Visual Scripting Towards Interactive Construction of Object-Oriented Applications", Jul. 1990.

* cited by examiner

*Primary Examiner* — Kyung-Hye Shin

(57) ABSTRACT

Architecture that introduces evaluation and decisionmaking (e.g., at the server) and allows a runtime decision to be made, on a per-request basis, as to where the data calculations will occur, on the server, on the client, or as a shared execution on both the server and the client. The decision can be made based on environment variables (e.g., permissions, network bandwidth, server load, etc.) of the user, for example. This approach provides performance tuning of a form by dynamically optimizing the location of execution of the code based on environment factors.

18 Claims, 8 Drawing Sheets

DYNAMIC POSTBACK FOR LOCATION CODE EXECUTION

BACKGROUND

Electronic forms usually take into consideration several factors to control what data on the form end users will be able to see or the extent of user interaction with the forms. These factors can include user privileges (e.g., permissions, roles), the personal data of the user (e.g., marital status, age, location), and the user environment (e.g., browser type, hardware capabilities, bandwidth capacity), for example. Each variation of these factors can change the content of the electronic form or the size of the data associated with the form controls which in turn can affect the performance of the form (e.g., load time, rendering time, number of simultaneous forms the server can handle (scale), and responsiveness to user actions).

The variety of these factors makes it very difficult and time consuming for developers to provide new functionality that satisfy the expected performance levels while accounting for all these factors. Thus, this forces the developers to make tradeoffs to optimize the electronic forms for the majority or specific target of the end users during coding phase. In fact, depending on the size of the data that needs to be processed, the electronic form performance can be enhanced by either running the logic that applies to the data in the browser environment on the client or on the server. For small datasets, live updates to formatting, calculations, filters, etc., are better computed in the browser and can be shown immediately without the latency or cost of a server roundtrip.

One approach decides whether a feature will need to run on the server or whether client-side code will be provided that enables most of the feature functionality on the user machine. The decision can be based mainly on the targeted usage scenario and the amount of data that will need to be exchanged between the browser and the server for that targeted scenario. Regardless of the decision, a subset of customers whose usage scenario can generate different data sizes end up experiencing deteriorated and sometimes unacceptable application performance.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture determines where to run a feature dynamically and at runtime. The architecture dynamically determines the optimum location (client and/or server) for execution of code. The determination is computed based on the behavior for each component of the electronic form (when run on the server or run on the client) that will provide the optimum performance given the user settings and data. This is accomplished without writing any additional code. Accordingly, this speeds the development cycle for electronic forms by freeing web developers from otherwise having to devote extra time and resources to tuning custom form web applications.

In one implementation, the determination considers only the amount of data that is to be handled by the client queries. Alternative implementations can consider alternatively or in combination therewith, permissions, network bandwidth, client hardware capabilities and current performance, server hardware and current performance, and so on.

To the accomplishment of the foregoing and related ends, certain illustrative aspects are described herein in connection with the following description and the annexed drawings. These aspects are indicative of the various ways in which the principles disclosed herein can be practiced, all aspects and equivalents of which are intended to be within the scope of the claimed subject matter. Other advantages and novel features will become apparent from the following detailed description when considered in conjunction with the drawings.

DETAILED DESCRIPTION

Figure 1:
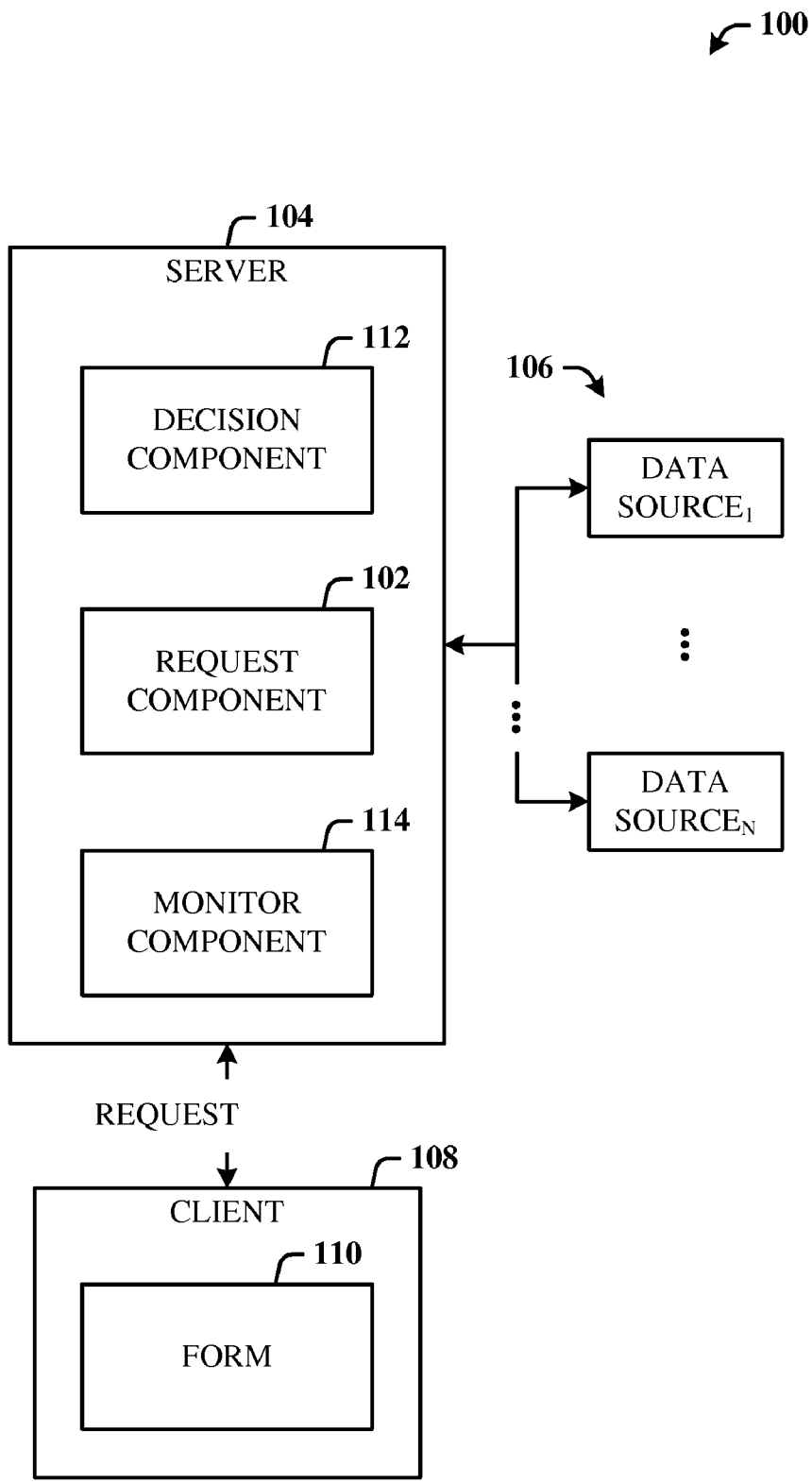
FIG. 1 illustrates a computer-implemented system for managing data processing.

Form rendering can require heavy operations on the servers and customers that use such a server should not be subjected to significant performance differences. This applies not only to scaling, but also to maintaining a pleasant and efficient user experience. There should be no significant degradation due to the form complexity or the number of forms handled by the server at that time. Customers that want to scale server farms to handle large numbers of forms should be able to do so by scaling up.

For each feature desired to be enabled on the server, the vendor oftentimes has to make a decision beforehand on how many operations can be front loaded for processing to the browser versus processed on the server.

The disclosed architecture introduces evaluation and decisionmaking (e.g., at the server) that allows a runtime decision to be made, on a per-request basis, as to where the processing (e.g., data processing, calculations, expressions, computing, etc.) will occur or how the processing may be apportioned. The decision can be made based on environment variables (e.g., permissions, network bandwidth, server load, etc.) of the user, for example. This approach provides performance tuning of a form by dynamically optimizing the location of execution of the code based on environment factors to not only maintain the client user experience, but also to facilitate system scale-up where desired.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a computer-implemented system 100 for managing data processing. The system 100 includes a request component 102 for receiving a request at a server 104 for data of one or more data sources 106. The request is received from a requesting client 108 for use of the data in a form 110. The system 100 also includes a decision component 112 for computing a decision on a per-request basis that directs processing of the data relative to the requesting client 108 and the server 104.

The decision of the decision component 112 directs the data to be processed on the server 104 when the amount of data is equal to or greater than a predetermined threshold. As described below, the disclosed architecture is not to be construed as limited to the amount of data, but can be based on other criteria or combinations of the amount of data and the other criteria. Alternatively, the decision component 112 directs the data to be processed on the requesting client 108 when the amount of data is less than the threshold. The decision component 112 computes the decision dynamically in response to receiving the request. The server 104 can be a forms server that provides web forms to a browser of the requesting client 108 such that the request component 102 and decision component 112 reside on the forms server, and the decision component 112 directs processing of the data on the server 104 or in a browser of the requesting client 108.

The decision directs processing of the data wholly on the requesting client 108, wholly on the server 104, or shared processing between both the requesting client 108 and the server 104.

The system 100 can further comprise a monitor component 114 for monitoring performance parameters of the requesting client 108 and/or the server 104. The decision component 112 computes the decision based in part on the performance parameters. The performance parameters can include information related to network bandwidth, hardware/software capabilities of the requesting client, hardware/software capabilities of the server, user selection of a control in the form, user permissions, and loading of the server, for example. This list is not exhaustive; thus, many other criteria can be considered, such as the type of data, time of day, previous history of the user or user system in interacting with the data, and so on.

In another implementation, the system 100 the request component for receiving the request at a forms server 104 for data of the one or more data sources 106, the request received via a browser of a requesting client 108 for use of the data in the form 110. The monitor component 114 monitors performance parameters (or criteria) of the requesting client 108 and the server 104. The decision component 112 dynamically computed the decision on a per-request basis that directs processing of the data wholly in the browser of the requesting client 108, wholly on the server 104, or shared processing between both the client browser and the server 104.

The decision component 112 directs the data to be processed on the server 104 when an amount of data is equal to or greater than a predetermined threshold, and directs the data to be processed on the requesting client 108 when the amount of data is less than the threshold. The performance parameters can include network bandwidth, hardware/software capabilities of the requesting client 108, hardware/software capabilities of the server 104, user selection of a control in the form, user permissions, and loading of the server, for example.

Figure 2:
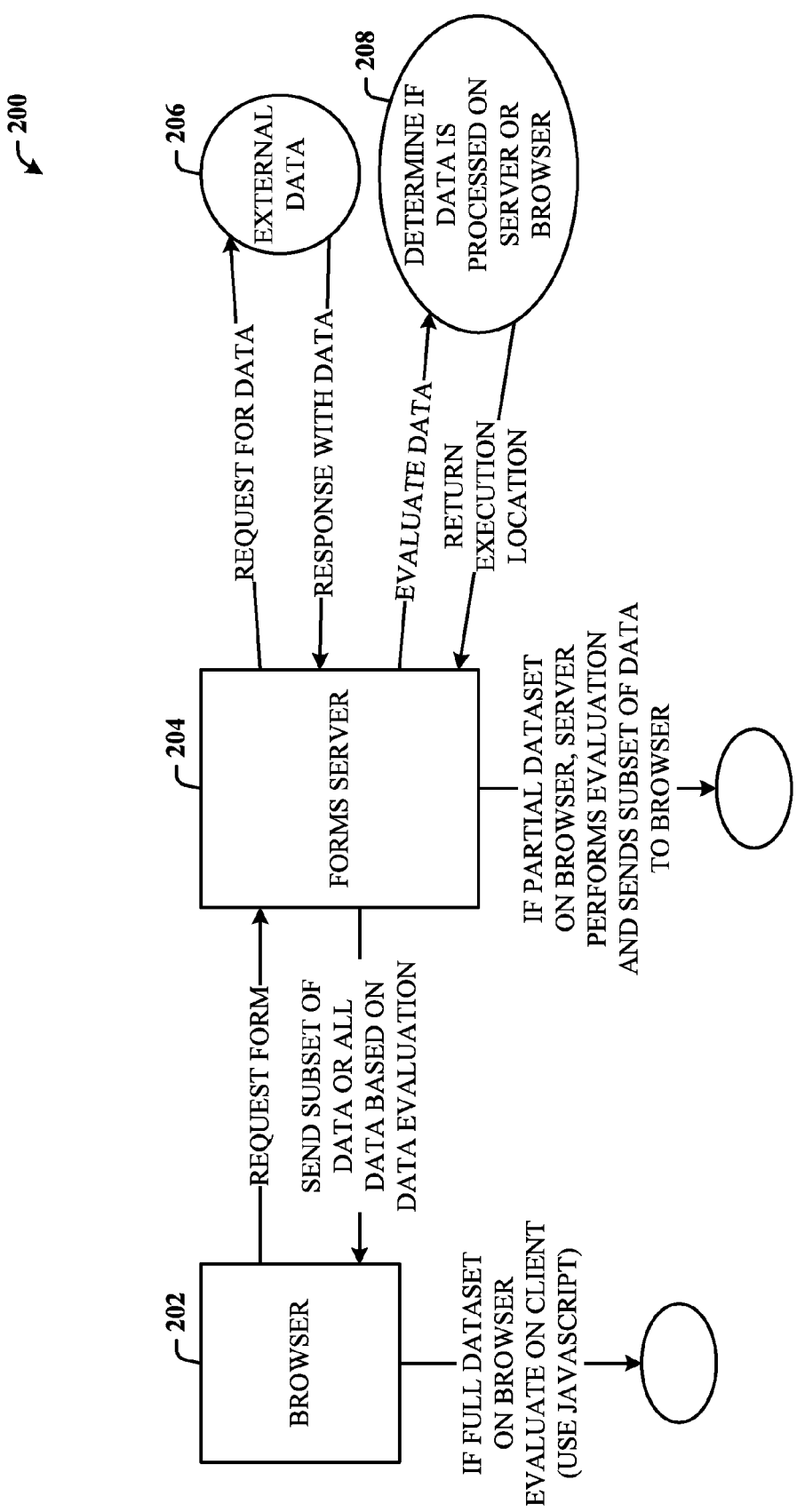
FIG. 2 illustrates a flow diagram that shows dynamic data location execution in accordance with an implementation of the disclosed architecture.

FIG. 2 illustrates a flow diagram 200 that shows dynamic data location execution in accordance with an implementation of the disclosed architecture. A user interacting with a browser 202 requests a form from a forms server 204. The server 204 then requests data for the form from a data source 206 (e.g., external data). The data source 206 responds with data back to the forms server 204. The server 204 then invokes a method 208 that evaluates the data (dataset) to determine if the data will be processed locally on the server 204 or in the browser 202 of the client. The method 208 returns location information to the server 204 as to where the data will be processed.

The data can be evaluated based on a number of criteria, one of which can be the amount (or size) of the data returned. If a huge dataset, the server 204 may be better equipped to handle the processing, in which case the server 204 performs the processing and passes the resulting dataset to the browser 202 for presentation in the form. It can also be the case that the criteria considers server loading, in which case if the server 204 is currently overloaded, the server 204 sends the full set of data to the browser where the client system processes the data. This can be accomplished using JavaScript, for example. It can also be the case that if the browser 202 already includes a partial dataset, such that the server 204 performs the evaluation and sends only a subset of the data to the browser 202, since some of the data already resides in the browser 202.

Figure 3:
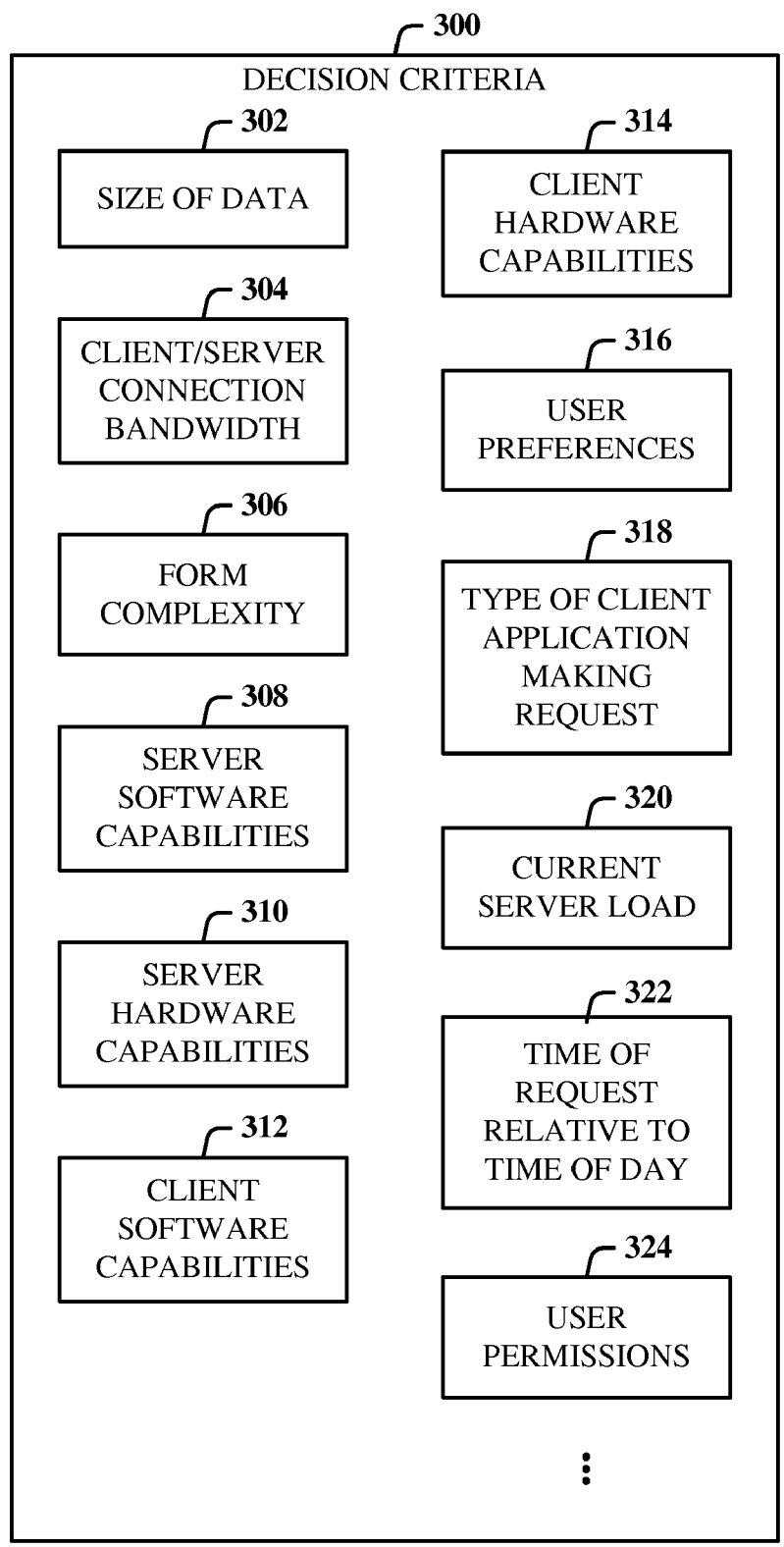
FIG. 3 illustrates decision criteria that can be considered at runtime on handling requests on a per-request basis.

FIG. 3 illustrates decision criteria 300 that can be considered at runtime on handling requests on a per-request basis. The criteria facilitate more granular control, in addition to the per-request basis, enabling a more optimized form interaction experience (e.g., with respect to latency). Moreover, this enables the administrator to tune the system based on environment variables and form types, for example.

Following are scenarios where server-side decisionmaking can be employed. A form allows the user to filter data based on user input in some fields or to employ rules or declarative logic that is triggered based on data processing. When the data that needs to be filtered is small enough to not affect the user experience, the server sends all the data to the client to allow the filtering to happen on the client. When the data is excessively large the server forces the postback (form and contents are sent back to server) and sends only the requested data to the user.

In another scenario, calculation of a field can request a value from an entry based on the selection in another field, for example, a purchase order where the user selects the city and Total field adds the tax based on the city/tax value. Additionally, other scenarios can involve conditional visibility (or formatting) where the server evaluates whether the server will send all the needed data to render the form (that contains hidden sections or optional sections) to the client or require postback to send the hidden data.

With respect to server controls, a hierarchy control is bound to a database and returns data based on the permissions assigned to each user. A user that can see a small subset of the tree will have the entire tree sent to the client, while other users have the control postback. Another scenario can involve multiple views of a form. Based on the size of the data/view, the data can be sent to render all views or just the data to render the current view.

Other scenarios can include lookup operations, and validation (e.g. checking that a user-entered value is a member of a list of valid values, where the size of the list of valid values determines if the check runs in the browser or server).

Following are examples of several factors (criteria) that can be employed to affect the server-side decision. It is to understood that the criteria considered to generate the decision can be a single factor, a combination of two or more of the factors, or all the factors. One factor is the size of the data 302 being handled. For each customer there can be a threshold beyond which the user experience in interacting with the form deteriorates. In other words, the user will spend more time waiting for the data to be downloaded, compared to the time the user spend waiting for a postback to the server to return data. The number of data items can also be considered as an alternative if the data size cannot be relied upon.

Network bandwidth 304 can be a factor that affects the data size threshold, since the slower the network bandwidth, the smaller is the data size threshold. There are multiple techniques that can be utilized to approximate the client specific bandwidth, including the time it takes to download core JavaScript, view JavaScript, and/or for processing of postbacks. These are specific examples of files having known sizes (the amount of data). Again, other criteria can be employed.

Form complexity 306 can be considered such that if the server is unable to conclude whether the form can be run on the client or the server, the default can be configured to run the form on the server. Complex forms can include many fields, perhaps field columns, multiple fieldsets, multiple forms on a single page, split parts of forms across multiple pages, etc., which may also be according to complex forms described in the Cascading Style Sheet (CSS) standard.

Server hardware capabilities 308 as well as server software capabilities 310 can be considered. For example, if the server runs quad (or even dual quad) processors, it will be more likely that the server can handle the data processing more efficiently than the client that may have less processor power. If the server is running a legacy server software version with reduced capabilities, it may be more efficient to pass the data processing to the client. Additionally, the client software capabilities 312 and the client hardware capabilities 314 can be considered. If the client software indicates a thin client, the server can decide to process the form data server-side. On the other hand, if the client is running the latest operating system and browser, with more equal or greater processing power than the server, the server can decide to pass the data processing (all or some) to the client.

Additional criteria can include user preference 316. For example, if the user prefers that the user client (e.g., browser) perform the data processing, the server can pass the data processing onto the client each time. The type of client application 318 making the request can also be a factor for consideration. For example, if the requesting application is not a browser (for a web form), the current application may be less robust for handling the client-side data processing. Thus, the server can monitor this and decide to perform data processing server-side. Conversely, running logic in JavaScript can be slower than running logic in the client application. Thus, the server can monitor this and decide to perform data processing client-side.

The current server load 320 can also be considered. If the server is currently experiencing loading, the decision can be to pass the data processing off to the client application. Alternatively, when loading is normal, the server can perform the data processing. Another factor can be the time of the request relative to the time of day 322. In other words, if the request is sent at a time when the server is normally unloaded, the decision can be made to perform data processing server-side. Other criteria can be employed and enabled as desired. For example, user permissions 324 can be considered as well as the type of data requested in the form can be considered.

Each of these criteria (and others) can be utilized to also share data processing between the server and the client. For example, if the connection bandwidth 304 is suitable, and form complexity is high, the server can decide to share the data processing with the client.

As previously described, by pushing form calculations to the client when data sizes are below a given threshold, and running calculations on the server otherwise, an optimized experience is provided for end users. However, this new mechanism may impact the server performance and scalability. The client-side rendering allows the bundling of multiple operations for execution on the server thereby reducing the amount of overhead for processing all queries separately.

Administrative control of the threshold setting for the data size, for example, allows administrators enhanced capability to control how this mechanism impacts server performance. A server performance parameter can include memory utilization as well. In general, the administrator can be allowed to configure one or more thresholds for a wide variety of criteria that include the data size, server CPU usage, memory usage, I/O (input/output) usage, and so on. The threshold can be applied to each form control individually, as well as the form as a whole. Threshold evaluation (for the decision) can be run the first time the document object is created and each time the object is pulled out of the session state. However, evaluation for each user interaction is not required, although this could be performed.

In terms of manageability, server behavior controls can be provided to administrators to adjust the server behavior. Farm administrators are able to specify custom threshold values that will override the default threshold setting.

Figure 4:
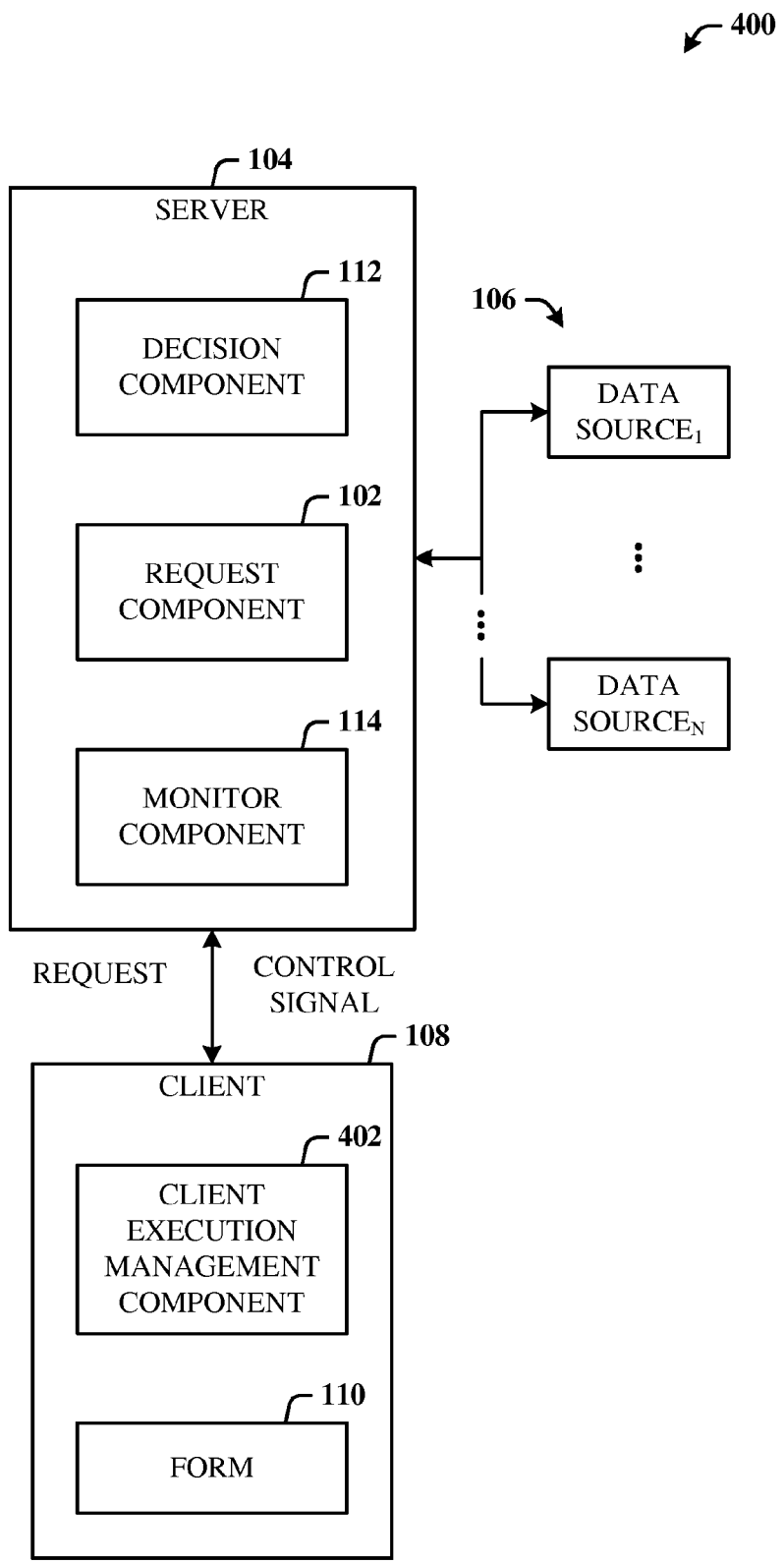
FIG. 4 illustrates an alternative system for managing data processing.

FIG. 4 illustrates an alternative system 400 for managing data processing. The system 400 includes the server 104 and components: the request component 102 for receiving a request for data of the one or more data sources 106, the decision component 112 for computing a decision, on a per-request basis, that directs processing of the data relative to the requesting client 108 and the server 104 (the decision based in part on evaluation of the data), and the monitor component 114 for monitoring performance parameters of the requesting client 108 and/or the server 104.

In this particular implementation, the client 108 can include a client execution management component 402 that monitors client processes and capabilities at any moment in time, such as when the data request is sent to the server 104 for form data. The client execution management component 402 can be triggered at request time to decide the state of the client 108 for receiving data from the server 104 for processing in the browser, rather than at the server 104. The decision, in the form of a control signal, can then be sent to the server monitor component 114 to impact whether the server 104 offloads the data to the client 108 for client processing or maintains data processing at the server 104. In other words, rather than the server 104 deciding independently, the client 108 can be part of the decisionmaking by the server 104. In this situation, the server 104 can decide to override the client control signal or to adhere to the control signal and maintain server-side processing of the data. By default, the client 108 need not send the control signal, which means that the server 104 can decide for the client 108.

Following is a series of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 5:
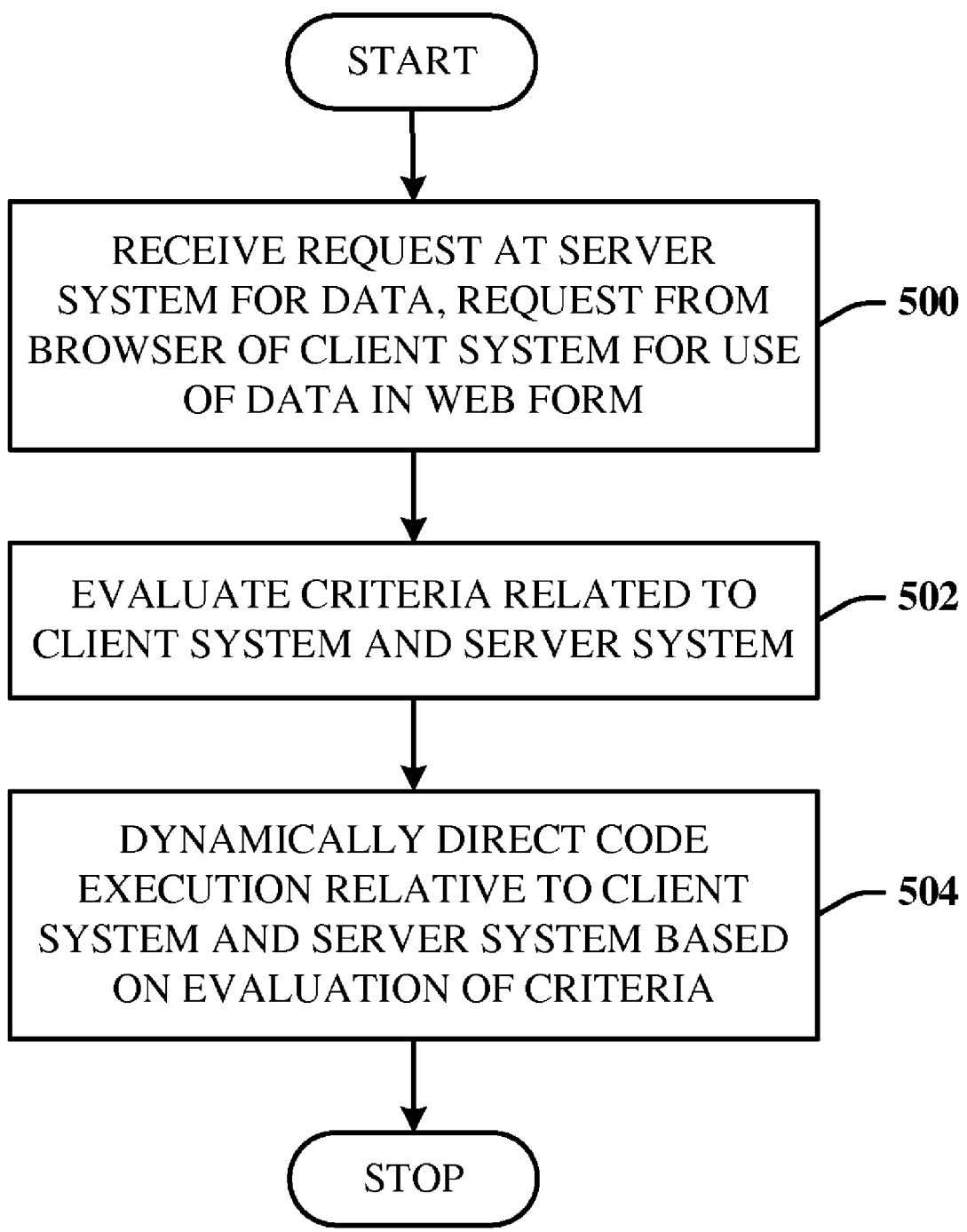
FIG. 5 illustrates a computer-implemented method of managing data processing.

FIG. 5 illustrates a computer-implemented method of managing data processing. At 500, a request is received at a server system for data, the request received from a browser of a client system for use of the data in a web form. At 502, criteria related to the client system and the server system is evaluated. At 504, code execution relative to the client system and the server system is dynamically directed based on evaluation of the criteria. The method can also include directing the code execution based on data calculations and data expressions (e.g., lookups into datasets or computing a sum or average) associated with the form and directing the code execution based on form controls bound to data sources. Data filtering (also referred to as showing a subset of the data based on user selections or permissions) can be applied to controls that are bound to data sources such as drop down menus, combination boxes, etc.

Figure 6:
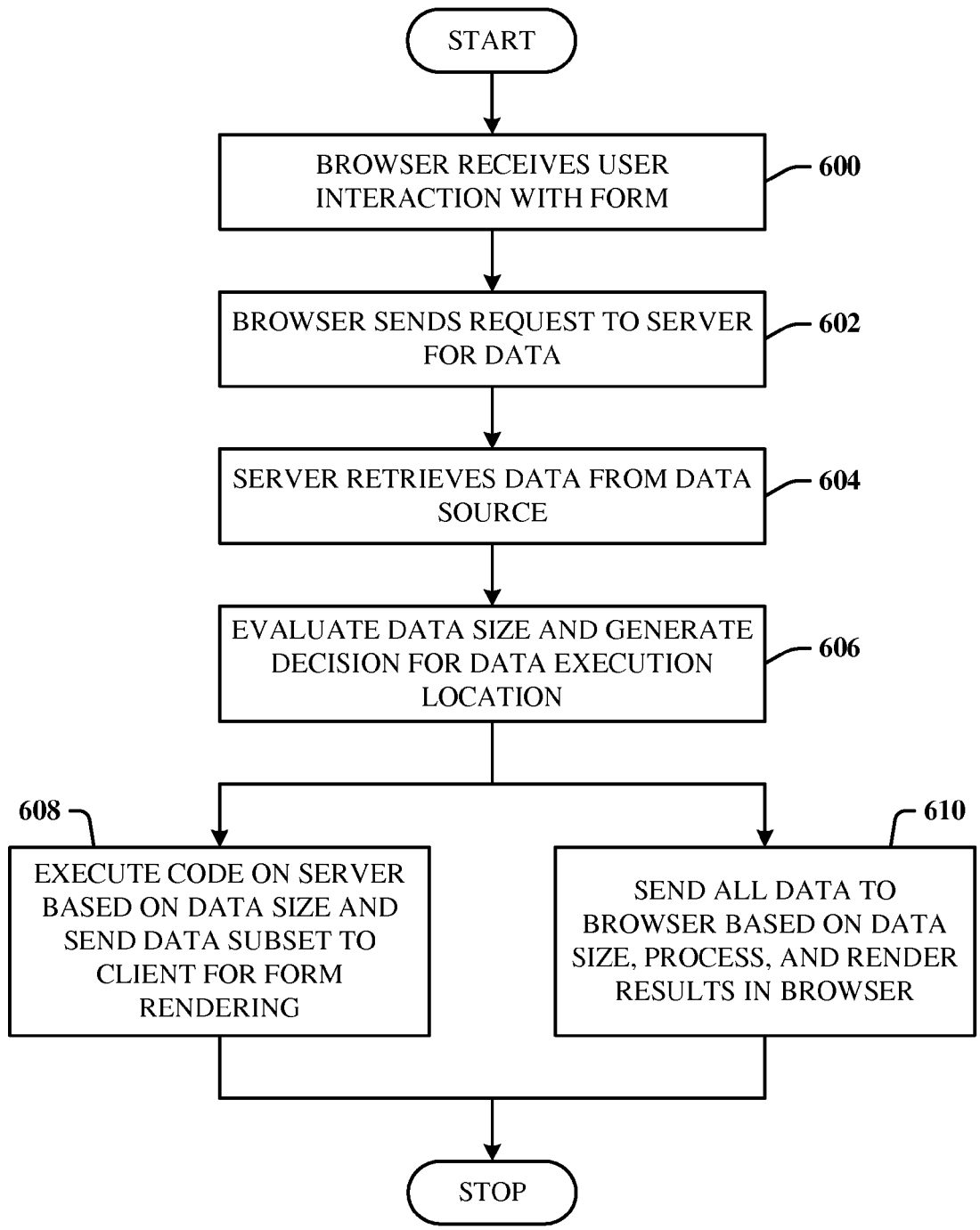
FIG. 6 illustrates a method of directing code execution based on data size.

FIG. 6 illustrates a method of directing code execution based on data size. At 600, the browser receives user interaction with the form (e.g., web form). At 602, the browser sends a request to the server for data. At 604, the server retrieves the data for processing from the data source (e.g., external). At 606, the data size is evaluated and a recommendation generated for the execution location. At 608, code is executed on the server based on the data size (e.g., exceeds a configured threshold), and the server returns a data subset to the client (e.g., browser) for form rendering. Alternatively, all data is sent to the browser based the data size, processed, and results rendered to the end user.

For example, code execution is directed to the browser based on the criteria, in the server system based on the criteria, where the criteria includes hardware and software capabilities of the client system and the server system, and network bandwidth between the server system and the client system. The code execution can also be directed to be shared between the server system and the client system based on the criteria. Moreover, code execution can be directed based on each control of the web form.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 7:
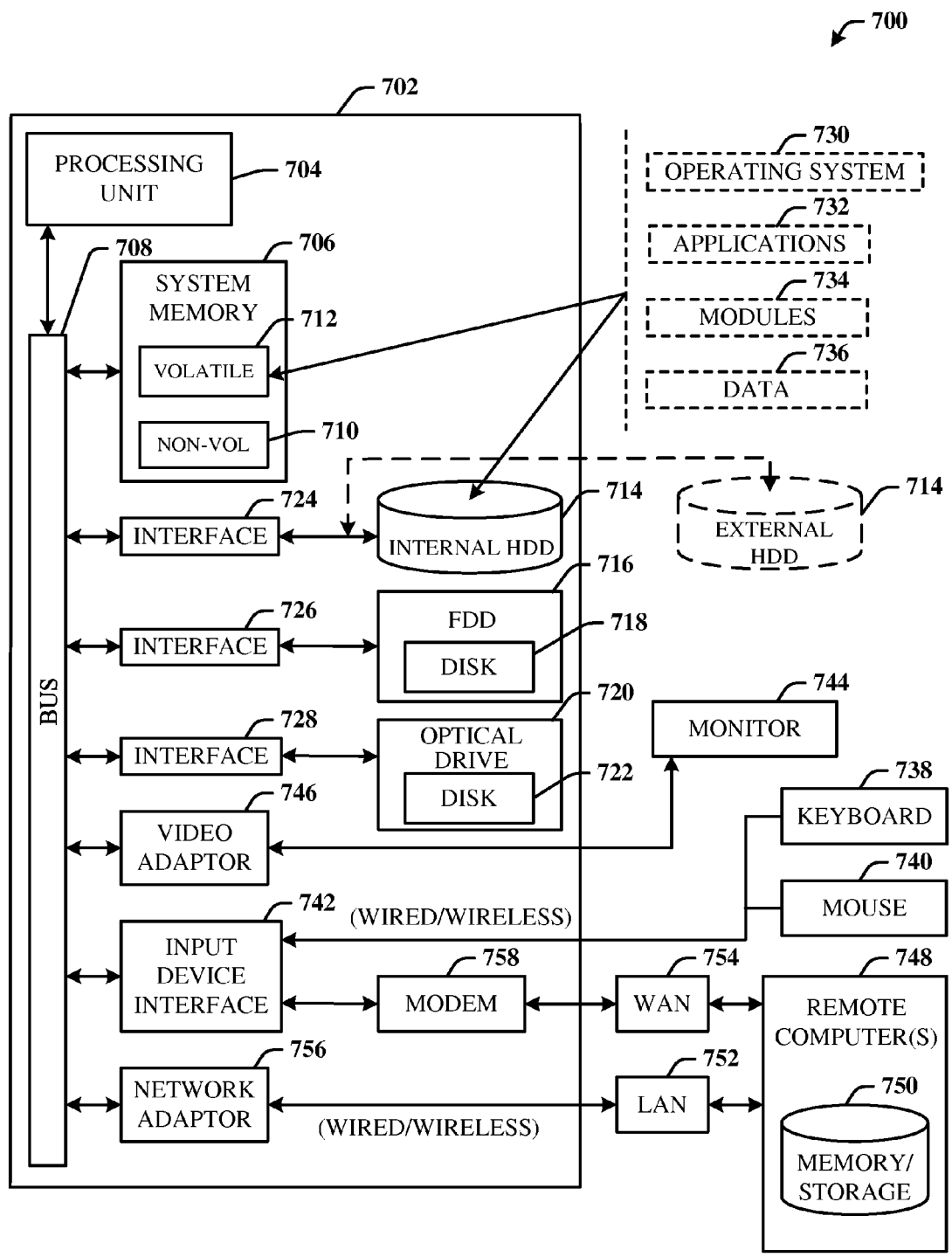
FIG. 7 illustrates a block diagram of a computing system operable to perform dynamic code location execution in accordance with the disclosed architecture.

Referring now to FIG. 7, there is illustrated a block diagram of a computing system 700 operable to perform dynamic code location execution in accordance with the disclosed architecture. In order to provide additional context for various aspects thereof, FIG. 7 and the following discussion are intended to provide a brief, general description of a suitable computing system 700 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 7, the exemplary computing system 700 for implementing various aspects includes a computer 702 having a processing unit 704, a system memory 706 and a system bus 708. The system bus 708 provides an interface for system components including, but not limited to, the system memory 706 to the processing unit 704. The processing unit 704 can be any of various commercially available processors. Dual microprocessors and other multi-processor architectures may also be employed as the processing unit 704.

The system bus 708 can be any of several types of bus structure that may further interconnect to a memory bus (with or without a memory controller), a peripheral bus, and a local bus using any of a variety of commercially available bus architectures. The system memory 706 can include non-volatile memory (NON-VOL) 710 and/or volatile memory 712 (e.g., random access memory (RAM)). A basic input/output system (BIOS) can be stored in the non-volatile memory 710 (e.g., ROM, EPROM, EEPROM, etc.), which BIOS are the basic routines that help to transfer information between elements within the computer 702, such as during start-up. The volatile memory 712 can also include a high-speed RAM such as static RAM for caching data.

The computer 702 further includes an internal hard disk drive (HDD) 714 (e.g., EIDE, SATA), which internal HDD 714 may also be configured for external use in a suitable chassis, a magnetic floppy disk drive (FDD) 716, (e.g., to read from or write to a removable diskette 718) and an optical disk drive 720, (e.g., reading a CD-ROM disk 722 or, to read from or write to other high capacity optical media such as a DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide nonvolatile storage of data, data structures, computer-executable instructions, and so forth. For the computer 702, the drives and media accommodate the storage of any data in a suitable digital format. Although the description of computer-readable media above refers to a HDD, a removable magnetic diskette (e.g., FDD), and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and volatile memory 712, including an operating system 730, one or more application programs 732, other program modules 734, and program data 736. Where the computer 702 operates as a server system, the one or more application programs 732, other program modules 734, and program data 736 can include the request component 102, server 104, decision component 112, monitor component 114, forms server 204, decision criteria 300, and methods of FIGS. 5 and 6, for example. Where the computer 702 operates as a client system, the one or more application programs 732, other program modules 734, and program data 736 can include the client 108, the form 110, the browser 202, and the client execution management component 402, for example.

All or portions of the operating system, applications, modules, and/or data can also be cached in the volatile memory 712. It is to be appreciated that the disclosed architecture can be implemented with various commercially available operating systems or combinations of operating systems.

A user can enter commands and information into the computer 702 through one or more wire/wireless input devices, for example, a keyboard 738 and a pointing device, such as a mouse 740. Other input devices (not shown) may include a microphone, an IR remote control, a joystick, a game pad, a stylus pen, touch screen, or the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, etc.

A monitor 744 or other type of display device is also connected to the system bus 708 via an interface, such as a video adaptor 746. In addition to the monitor 744, a computer typically includes other peripheral output devices (not shown), such as speakers, printers, etc.

The computer 702 may operate in a networked environment using logical connections via wire and/or wireless communications to one or more remote computers, such as a remote computer(s) 748. The remote computer(s) 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, is connected to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Figure 8:
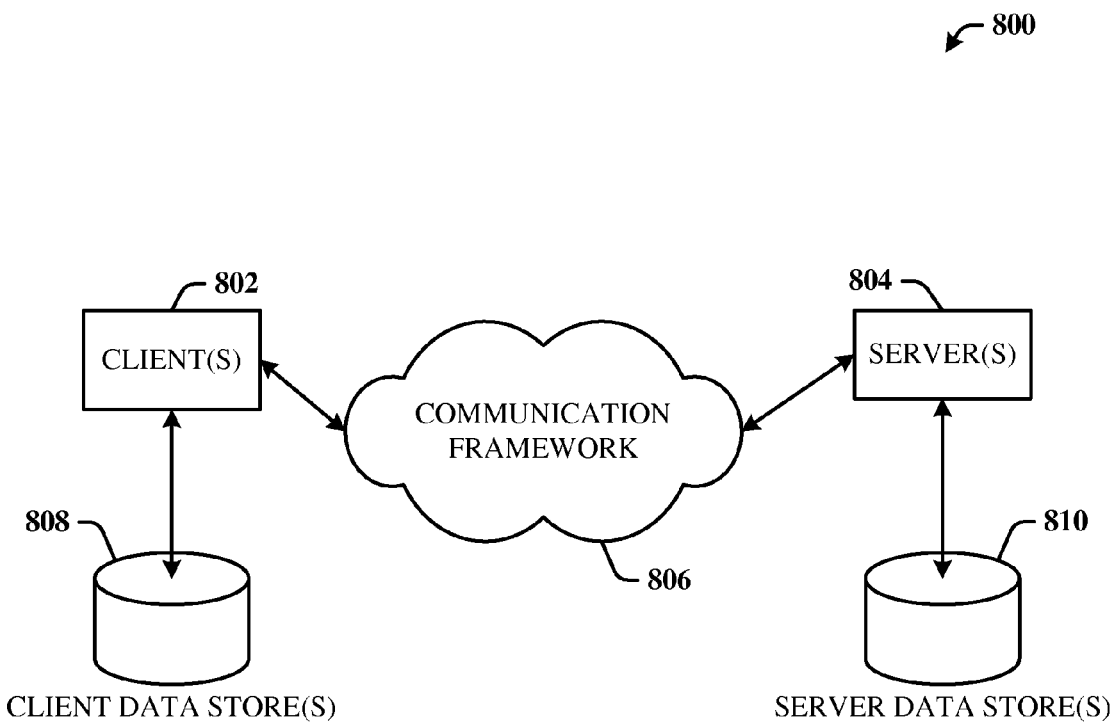
FIG. 8 illustrates a schematic block diagram of an exemplary computing environment for client/server code location execution based on certain criteria.

Referring now to FIG. 8, there is illustrated a schematic block diagram of an exemplary computing environment 800 for client/server code location execution based on certain criteria. The environment 800 includes one or more client(s) 802. The client(s) 802 can be hardware and/or software (e.g., threads, processes, computing devices). The client(s) 802 can house cookie(s) and/or associated contextual information, for example.

The environment 800 also includes one or more server(s) 804. The server(s) 804 can also be hardware and/or software (e.g., threads, processes, computing devices). The servers 804 can house threads to perform transformations by employing the architecture, for example. One possible communication between a client 802 and a server 804 can be in the form of a data packet adapted to be transmitted between two or more computer processes. The data packet may include a cookie and/or associated contextual information, for example. The environment 800 includes a communication framework 806 (e.g., a global communication network such as the Internet) that can be employed to facilitate communications between the client(s) 802 and the server(s) 804.

Communications can be facilitated via a wire (including optical fiber) and/or wireless technology. The client(s) 802 are operatively connected to one or more client data store(s) 808 that can be employed to store information local to the client(s) 802 (e.g., cookie(s) and/or associated contextual information). Similarly, the server(s) 804 are operatively connected to one or more server data store(s) 810 that can be employed to store information local to the servers 804. The client(s) 802 can include the client 108, and browser 202, for example, and the server(s) 804 can include the server 104, forms server 204.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system, comprising:
   a processor with memory for executing software instructions;
   a request component of a forms server for receiving a request at the server for form data of one or more data sources, the request received from a requesting client for use of the form data in an electronic web form, the forms server provides the web form to a browser of the requesting client; and
   a decision component of the forms server that computes a decision on a per-request basis to share processing of the form data between the requesting client and the server, the decision component directs processing of the form data on the server or in the browser of the requesting client based on performance parameters, include at least one of network bandwidth, a form data size threshold determined by a form data size, hardware/software capabilities of the requesting client, hardware/software capabilities of the server, user selection of a control in the form, user permissions, or loading of the server;
   wherein a hierarchy control is bound to a database and returns data based on permissions assigned to each user.

2. The system of claim 1, wherein the decision component directs the form data to be processed on the server when an amount of form data is equal to or greater than a predetermined threshold, and directs the form data to be processed on the requesting client when the amount of form data is less than the threshold.

3. The system of claim 1, wherein the decision component computes the decision dynamically in response to receiving the request.

4. The system of claim 1, wherein the decision directs processing of the form data wholly on the requesting client, wholly on the server, or shared processing between both the requesting client and the server.

5. The system of claim 1, further comprising a monitor component for monitoring the performance parameters of the requesting client and the server, the decision component computing the decision based in part on the performance parameters.

6. A computer-implemented system, comprising:
   a processor with memory for executing software instructions;
   a request component of a forms server for receiving a request at the forms server for data of one or more data sources, the request received via a browser of a requesting client for use of the data in an electronic web form, the forms server provides the web form to the browser of the requesting client;
   a monitor component for monitoring performance parameters of the requesting client and the server, the performance parameters include network bandwidth, a form data size threshold determined by a form data size and the network bandwidth hardware/software capabilities of the requesting client, hardware/software capabilities of the server, user selection of a control in the form, user permissions, and loading of the server; and
   a decision component of the forms server that dynamically computes a decision on a per-request basis and directs shared processing of the data between the client and the server such that processing of the data is performed wholly in the browser of the requesting client, wholly on the server, or shared processing between both the browser and the server;
   wherein a hierarchy control is bound to a database and returns data based on permissions assigned to each user.

7. The system of claim 6, wherein the decision component directs the data to be processed on the server when an amount of data is equal to or greater than a predetermined threshold, and directs the data to be processed on the requesting client when the amount of data is less than the threshold.

8. The system of claim 6, wherein the performance parameters include network bandwidth, hardware/software capabilities of the requesting client, hardware/software capabilities of the server, user selection of a control in the form, user permissions, and loading of the server.

9. A computer-implemented method of managing data, comprising:
   employing a computer programmed to perform the method;
   receiving a request at a forms server system for data, the request received from a browser of a client system for use of the data in an electronic web form;
   evaluating criteria related to processing performance of both the client system and the forms server system, the performance based on at least one of network bandwidth, hardware/software capabilities of the requesting client, hardware/software capabilities of the server, user selection of a control in the form, user permissions, or loading of the forms server; and dynamically directing code execution to implement shared processing of the data between the client system and the forms server system based on evaluation of the criteria; wherein calculation of a field can request a value from an entry based on the selection in another field.

10. The method of claim 9, further comprising directing code execution in the browser based on the criteria.

11. The method of claim 9, further comprising directing the code execution in the server system based on the criteria and passing a subset of the data to the browser for processing and presentation.

12. The method of claim 9, further comprising directing the code execution relative to the client system and the server system based on size of the data.

13. The method of claim 9, further comprising directing the code execution based on hardware and software capabilities of the client system and the server system.

14. The method of claim 9, further comprising directing the code execution on each control of the web form.

15. The method of claim 9, further comprising directing the code execution based on network bandwidth between the server system and the client system.

16. The method of claim 9, further comprising directing the code execution to be shared between the server system and the client system based on the criteria.

17. The method of claim 9, further comprising directing the code execution based on data operations that include filtering, calculations, conditional formatting, and lookups, and data expressions associated with the form.

18. The method of claim 9, further comprising directing the code execution based on form controls bound to data sources.

* * * * *